C. W. BECK.
TWO-PART FASTENER FOR VEHICLE TOPS, GLOVES, AND THE LIKE.
APPLICATION FILED SEPT. 27, 1911.
1,065,498.
Patented June 24, 1913.
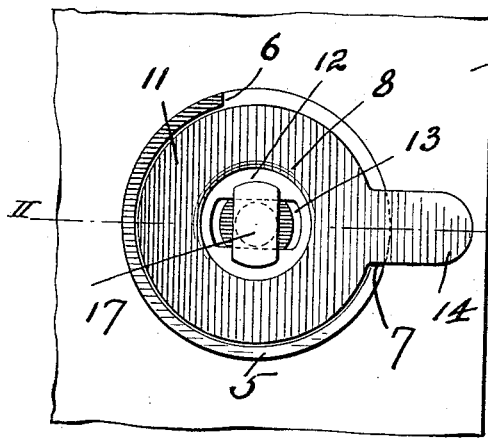
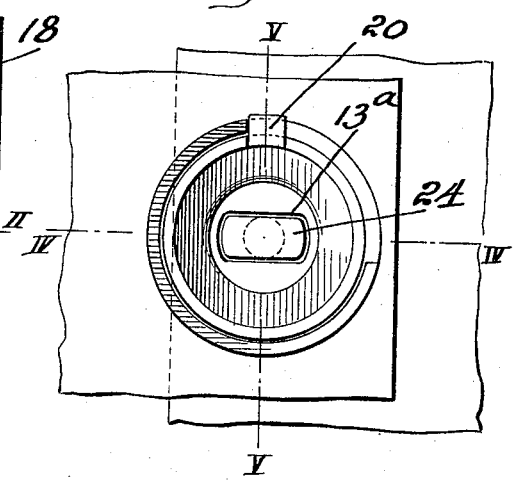
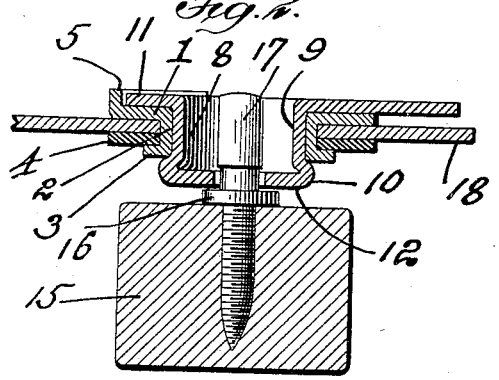
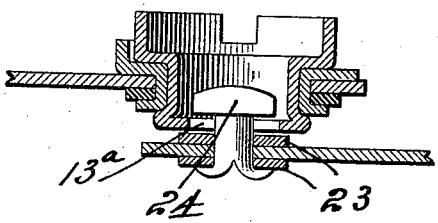
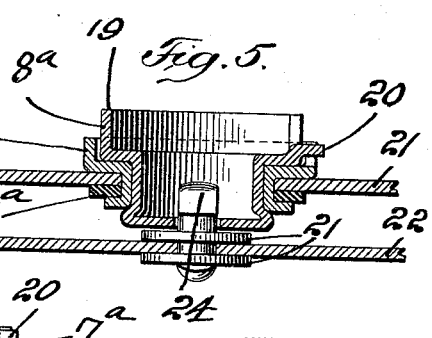
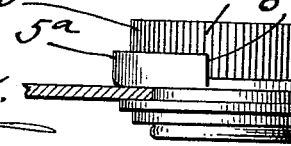
WITNESSES:
INVENTOR
Charles W. Beck
BY
ATTORNEYS

UNITED STATES PATENT OFFICE.

CHARLES W. BECK, OF ROCKVILLE CENTER, NEW YORK, ASSIGNOR, BY MESNE ASSIGNMENTS, TO MICHIGAN MOTOR SPECIALTIES COMPANY, OF DETROIT, MICHIGAN, A CORPORATION OF MICHIGAN.

TWO-PART FASTENER FOR VEHICLE-TOPS, GLOVES, AND THE LIKE.

1,065,498. Specification of Letters Patent. Patented June 24, 1913.

Application filed September 27, 1911. Serial No. 651,510.

*To all whom it may concern:*

Be it known that I, CHARLES W. BECK, a citizen of the United States, a resident of Rockville Center, county of Nassau, and State of New York, have invented certain new and useful Improvements in Two-Part Fasteners for Vehicle-Tops, Gloves, and the Like, of which the following is a specification.

The main object of this invention is to provide a very simple two-part fastener for locking a vehicle curtain in place, and which may be very cheaply manufactured.

Another object of the invention is to provide a two-part fastener adapted for use on vehicle curtains, gloves and the like, which will not project to any considerable extent beyond the outer surface of the vehicle curtain or the outer surface of the glove, as the case may be, the interlocking stud forming one part of the fastener being so arranged that it will not project beyond the outer surface of the rotatable locking part.

Other objects and advantages of the invention will appear hereinafter.

In the drawing, Figure 1 is a face view of the fastener complete showing the movable part turned to interlock it with the locking stud; Fig. 2 is a central sectional view on the line II—II of Fig. 1; Fig. 3 a face view of a slightly different form of fastener, the rotatable locking part being turned to permit it to be disconnected from the locking stud; Fig. 4 a central sectional view on the line IV—IV of Fig. 3; Fig. 5 a similar sectional view on the line V—V of Fig. 3; Fig. 6 a side elevation of the form of fastener shown in Fig. 1, the locking stud being disconnected and removed.

Referring to the various parts by numerals, 1 designates the main cylindrical part of the fastener which is provided with a tubular part 2 adapted to pass through the fabric or other material to which the fastener is to be secured, the inner end of said tubular part being turned outwardly and clenched at 3 over a suitable washer 4. This main stationary part of the fastener is formed with an outwardly extending annular flange 5, said flange being cut away to form the shoulders 6 and 7, said shoulders serving as stops for the rotatable part of the fastener as will be hereinafter pointed out. Mounted in the tubular part 2 is the rotatable member 8 of the fastener. This rotatable member consists of the tubular part 9 which is enlarged slightly at its inner end, as at 10, to permanently retain said rotatable part or member in the main stationary member. At its outer end, the tubular portion 9 is formed with the laterally extending circular flange 11 which lies within the flange 5, as shown clearly in Fig. 1. The inner end of the tubular part 9 is closed by a wall 12 in which is formed a non-circular slot 13; and the flange 11 is formed with a laterally extending lug 14 which is adapted to serve as a finger piece by which the tubular part 8 may be rotated, and also to serve as a stop to contact with the shoulders 6 and 7. These shoulders are so arranged that they permit the rotatable member 8 to have a one-quarter turn or revolution. In the permanent part of the vehicle top 15, is secured a stud 16 having a non-circular head 17, said head being substantially of the same shape in cross section as the slot 13 in the rotatable member but of slightly smaller dimensions so that it may readily pass through said slot. The operation of this form of fastener is obvious. The locking stud is so placed in the permanent part of the vehicle top that when the stop 14 of the rotatable member is against one of the shoulders 7 the said head may be readily passed through the slot 13. It is obvious that by then turning the rotatable member to bring the stop 14 against the other shoulder, the slot will be at right-angles to the head of the locking stud and that the fastener will then be locked to the stud. The material 18 of which the curtain top is formed is clamped between the washer 4 and the main or non-rotatable member 1 of the fastener. The tubular part 8 of the rotatable member is preferably of sufficient depth to receive the head of the locking stud so that said head will not project beyond the outer surface of the fastener.

In Figs. 3, 4 and 5 is illustrated a slightly different form of fastener. In this form of the device the rotatable member 8ᵃ is formed with an outwardly extending flange 19 and extends beyond the outwardly extending flange 5ᵃ of the non-rotatable member, said flange being milled on its outer surface so that it may be readily gripped and turned. A portion of this outwardly extending flange 19 is turned outwardly to form a stop lug 20, said lug being arranged to contact with the shoulders 6ª and 7ª on the flange 5ª. This form of fastener is well adapted for use as a glove fastener. One portion of the glove 21 being secured between the part 5ª and the washer 4ª and the other portion 22 of the glove being secured between the washers 23 carried by the locking stud 24. In this form of the device the locking stud is preferably in the form of a rivet clenched over and held in place by the washers 23.

The outwardly extending part 19 of the rotatable member forms a convenient means for gripping said member and rotating it. The slot 13ª of the rotatable member and the head of the stud 24 are properly arranged so that by giving the rotatable member a one-quarter turn they may be interlocked or disconnected as desired.

The fasteners of this construction may be readily and cheaply manufactured; will not project to any great extent beyond the outer surface of the material used and will be very efficient in operation.

Having thus fully described my invention, what I claim as new and desire to secure by Letters Patent, is:

1. A fastener comprising a main non-rotatable member adapted to be secured to a curtain or the like and consisting of a tubular part adapted to extend through the curtain material and means for rigidly clamping said tubular part to said material, and a rotatable member mounted in said main member and consisting of a tubular part extending through the main member and having a wall at its inner end provided with a slot, a non-rotatable locking stud adapted to be passed through said slot of the rotatable member in one position of said member and to be locked thereto by a partial rotation of said rotatable member.

2. A fastener comprising a main tubular part having a flange at one end, said tubular part being expanded at its other end for attachment to the material carrying the fastener, a rotatable tubular part fitting the main part, said tubular part being expanded on its inner end to rotatably interlock it with the main part, said rotatable part having a wall at its inner end provided with a slot, stops formed on the flange of the stationary part and a stop piece carried by the rotatable part and adapted to engage the stops on the main non-rotatable part.

In testimony whereof I hereunto affix my signature in the presence of two witnesses.

CHARLES W. BECK

Witnesses:
  HARRY B. SWAN,
  JEFFERSON G. THURBER.